United States Patent [19]

Krause et al.

[11] Patent Number: 4,873,046

[45] Date of Patent: * Oct. 10, 1989

[54] PRODUCTION OF STRETCHED ION-EXCHANGE MEMBRANE

[75] Inventors: Janusz J. H. Krause; Peter J. Smith, both of Northwhich; Robin A. Woolhouse, Bunbury, Nr Taporley, all of England

[73] Assignee: Imperial Chemical Industries PLC, London, England

[*] Notice: The portion of the term of this patent subsequent to Oct. 14, 2003 has been disclaimed.

[21] Appl. No.: 85,786

[22] Filed: Aug. 17, 1987

Related U.S. Application Data

[63] Continuation of Ser. No. 466,145, Feb. 14, 1983, abandoned.

[30] Foreign Application Priority Data

Feb. 17, 1982 [GB] United Kingdom ............... 8204575

[51] Int. Cl.$^4$ .................. B29C 55/00; B29B 17/00
[52] U.S. Cl. .................. 264/288.4; 264/290.2; 264/294; 264/346
[58] Field of Search ............ 264/288.4, 288.8, 290.2, 264/294, 346

[56] References Cited

U.S. PATENT DOCUMENTS

| | | | |
|---|---|---|---|
| 3,801,404 | 4/1974 | Druin et al. | 264/288.8 |
| 4,000,057 | 12/1976 | Mrazek et al. | 204/296 |
| 4,124,477 | 11/1978 | Tokawa | 204/252 |
| 4,124,477 | 11/1978 | Tokawa et al. | 204/252 |
| 4,257,997 | 3/1981 | Soehngen et al. | 264/288.8 |
| 4,617,163 | 10/1986 | Smith | 264/288.4 |

FOREIGN PATENT DOCUMENTS 2055369 of 0000 Fed. Rep. of Germany .

*Primary Examiner*—Joseph L. Schofer
*Assistant Examiner*—Peter F. Kulkosky
*Attorney, Agent, or Firm*—Cushman, Darby & Cushman

[57] ABSTRACT

A method of producing an ion-exchange membrane suitable for use in an electrolytic cell in which the membrane is expanded by stretching at elevated temperature to increase the surface area per unit weight of the membrane. The membrane may be annealed at elevated temperature, and may be cooled while restrained in the expanded state. The membrane when used in an electrolytic cell remains taut and unwrinkled and leads to reduced voltage operation of the cell.

14 Claims, No Drawings

PRODUCTION OF STRETCHED ION-EXCHANGE MEMBRANE

This is a continuation of application Ser. No. 466,145 filed Feb. 14, 1983, now abandoned.

This invention relates to the production of an ion-exchange membrane and in particular to production of an ion-exchange membrane suitable for use in an electrolytic cell.

Electrolytic cells are known comprising a plurality of anodes and cathodes with each anode being separated from the adjacent cathode by an ion-exchange membrane which divides the electrolytic cell into a plurality of anode and cathode compartments. The anode compartments of such a cell are provided with means for feeding electrolyte to the cell, suitably from a common header, and with means for removing products of electrolysis from the cell. Similarly, the cathode compartments of the cell are provided with means for removing products of electrolysis from the cell, and optionally with means for feeding water or other fluid to the cell. The electrolytic cells may be of the monopolar or bipolar type.

For example, electrolytic cells of the filter press type may comprise a large number of alternating anodes and cathodes, for example, fifty anodes alternating with fifty cathodes, although the cell may comprise even more anodes and cathodes, for example up to one hundred and fifty alternating anodes and cathodes.

In such an electrolytic cell the membranes are essentially hydraulically impermeable and in use ionic species, e.g. hydrated ionic species, are transported across the membrane between the anode and cathode compartments of the cell. Thus, when an aqueous alkali metal chloride solution is electrolysed in a cell equipped with cation-exchange membranes the solution is fed to the anode compartments of the cell and chlorine produced in the electrolysis and depleted alkali metal chloride solution are removed from the anode compartments, alkali metal ions are transported across the membranes to the cathode compartments of the cell to which water or dilute alkali metal hydroxide solution may be fed, and hydrogen and alkali metal hydroxide solution produced by the reaction of alkali metal ions with hydroxyl ions are removed from the cathode compartments of the cell.

Electrolytic cells of the type described may be used particularly in the production of chlorine and sodium hydroxide by the electrolysis of aqueous sodium chloride solution.

Ion-exchange membranes for use in such electrolytic cells are generally cation-exchange membranes and, particularly where the liquors in the cell are corrosive as in a chlor-alkali cell, the membrane may be a film of a fluoropolymer containing acidic groups, or derivatives of acidic groups.

Suitable acidic groups are sulphonic acid, carboxylic acid or phosphonic acid, or derivatives thereof.

The ion-exchange membrane generally is in the form of a film having a thickness in the range of 2 mm to 0.2 mm.

Although the ion-exchange membrane is electrically conducting the membrane does possess an electrical resistance, and the voltage at which an electrolytic cell may be operated is dependent in part on the resistance of the membrane. The electrical resistance of the membrane is a function of the thickness of the membrane and in order to reduce the voltage of operation of an electrolytic cell, and also the capital cost of the membrane, it is desirable that the thickness of the membrane be reduced.

Furthermore, is such an electrolytic cell the membrane is secured to the cell, for example, by clamping between gaskets. It is desirable that the membrane be installed in the cell in a taut state and that the membrane remain in a substantially taut state when electrolyte is charged to the cell and the cell is operated. However, if a membrane is installed in an electrolytic cell in a dry state and is fixed tautly therein it is found in use that when electrolyte is contacted with the membrane in the cell the membrane swells and expands and becomes slack and may even become wrinkled. As a result there may be uneven release of gas and an increase in the voltage of the cell. This is a particular disadvantage where the cell is designed to operate at low, or zero, anode-cathode gap.

In order to alleviate this problem of swelling of the membrane in use it has been proposed to pre-swell the membrane before installing the membrane in an electrolytic cell, for example by soaking the membrane in water, in an aqueous sodium chloride solution, or in an aqueous sodium hydroxide solution. Ideally, the membrane should be pre-swelled to an extent approximately the same as that by which a dry membrane would be swelled by contact with the electrolyte in the electrolytic cell. In U.S. Pat. No. 4000057 there is described the pre-swelling of a membrane before installation of the membrane in an electrolytic cell the method comprising contacting the membrane with a liquid medium in which the membrane exhibits a substantially flat expansion versus time curve for at least four hours after contacting the membrane with the liquid medium. Suitable liquid media include, for example, aqueous solutions of ethylene glycol, glycerine and higher fatty alcohols.

Although the aforementioned methods do assist in overcoming the problem of swelling of a membrane when the membrane is contacted with electrolyte in an electrolytic cell they do suffer from substantial disadvantages. Thus, the pre-swelled membranes are wet and remain wet during installation in the electrolytic cell and are thus difficult to handle. Special handling precautions may need to be taken, for example where the membrane has been pre-swelled by contact with a corrosive liquid, e.g. a caustic soda solution. Also difficulty may also be experienced in securing the wet membrane in the electrolytic cell in a leak-tight manner, for example between a pair of gaskets.

We are also aware that in Japanese Patent Publication No. 54 029892 it has been proposed to regenerate a used perfluorocarbon cation-exchange membrane by pressing the membrane at a temperature between 100° C. and the decomposition temperature of the membrane and at a pressure of 5 to 50 kg/cm² in order to reduce the weight per unit area of the membrane.

The present invention relates to a method by which the thickness of an ion-exchange membrane may be reduced which method results in production of a membrane which operates at reduced voltage in an electrolytic cell, which in use in such a cell does not become wrinkled, and which in use may result in production of electrolytic products at an increased current efficiency.

According to the present invention there is provided a method of producing an ion-exchange membrane of an organic polymer containing ion-exchange groups or groups conversible to ion-exchange groups in which method the membrane is expanded to increase the surface area per unit weight of the membrane, characterised in that a film of the membrane is heated at an elevated temperature and the membrane is stretched at the elevated temperature in order to increase the surface area per unit weight of the membrane.

In the method of the invention the membrane is expanded by stretching so that the surface area per unit weight of the membrane is increased. This expansion of the membrane does not depend on the use of a liquid medium to swell and thus expand the membrane. Indeed, the expansion by stretching will generally be effected, and is preferably effected, on a dry membrane, thus avoiding the substantial disadvantages associated with use of a liquid medium. Furthermore, the expansion is not effected merely by pressing the membrane at elevated pressure and temperature.

In the method of the invention at least some of the expansion of the membrane which is effected by stretching at elevated temperature is "locked" into the membrane when the membrane is cooled to a lower temperature, for example, to ambient temperature, and the thus produced membrane is in a form particularly suitable for use in an electrolytic cell.

It is known that the ion-exchange membranes, when contacted with the electrolyte in an electrolytic cell, absorb electrolyte and swell, with the result that, even though the membrane may have been installed tautly in the cell, the expansion of the membrane results in a slackening of the membrane and an uneven surface on the membrane, and even a wrinkled membrane. Wrinkling of the membrane results in poor gas release from the surface of the membrane, and a consequent increase in voltage of operation of the cell.

When expanded stretched membrane produced in the method of the invention is installed in an electrolytic cell and secured therein and the membrane is contacted with an electrolyte, particularly at an elevated temperature, for example with aqueous alkali metal chloride solution at a temperature which may be as high as 95° C. in a chlor-alkali cell, the expansion which is "locked" into the membrane is released, or partially released, and the membrane tends to contract towards its original state, although the membrane is of course restrained in the electrolytic cell. This tendency to contract is counteracted by the expansion of the membrane caused by swelling brought about by contacting the membrane with the electrolyte, with the result that the membrane installed in the electrolytic cell remains taut and does not become wrinkled during use.

In order that the bulk of the expansion of the membrane effected by stretching may be "locked" into the membrane the membrane may be cooled from an elevated temperature to a lower temperature whilst the membrane is restrained in the expanded, stretched state. However, when such a membrane is used in an electrolytic cell the contraction of the membrane which occurs when the membrane is contacted with electrolyte at elevated temperature may be much greater than the expansion caused by swelling of the membrane by absorption of electrolyte, and the membrane may tend to tear. Whether or not there is any tendency to tear will of course depend on the exent of the expansion of the membrane effected by stretching.

It is preferred, where the extent of expansion of the membrane which is effected by stretching is substantial, in order for example to produce a membrane which has a much increased surface area per unit weight and which thus is capable of operating at a substantially reduced voltage in an electrolytic cell, for the expanded, stretched membrane to be annealed by heating at elevated temperature and subsequently to cool the membrane to a lower temperature. In this way sufficient expansion may be "locked into" the membrane for the membrane to remain unwrinkled during use in an electrolytic cell and also any tendency for the membrane to tear during use may be overcome.

The stretching of the membrane should be effected with care in order not to tear the membrane. The use of elevated temperature during the stretching of the membrane, as in the method of the present invention, greatly assists in avoiding tearing of the membrane.

The stretching may be effected, for example, by passing the membrane around and between rollers operating at different peripheral speeds, and the expanded, stretched membrane may if desired be annealed before cooling to a lower temperature.

Alternatively, the membrane may be stretched by applying a stretching force to opposed edges of the membrane, and the expanded, stretched membrane may if desired be annealed before cooling to a lower temperature. The stretching of the membrane may be effected in a stretching frame or machine.

The membrane may be stretched uniaxially or biaxially. Biaxially stretching may be effected in two directions simultaneously or sequentially.

When the membrane is stretched uniaxially strips of relatively stiff material may be attached to opposed edges of the membrane to prevent contraction of the membrane in a direction transverse to that in which the membrane is stretched.

In general the expansion of the membrane effected by stretching in the method of the invention will be such as to result in an increase of at least 5% in the surface are per unit weight of the membrane, that is a decrease of at least 5% in the thickness of the membrane.

In order to prevent wrinkling of the membrane when the membrane is subsequently used in an electrolytic cell and increase of about 15 to 20% in the surface area per unit weight of the membrane will generally be sufficient.

In order that the expansion of the membrane should result in a substantial reduction in voltage when the membrane is used in an electrolytic cell the expansion which is effected by stretching is preferably such as to result in an increase of at least 50%, preferably at least 100%, in the surface area per unit weight of the membrane, that is a decrease of at least 50%, preferably at least 100%, in the thickness of the membrane. The stretching may effect a 10-fold increase or greater in the surface per unit weight of the membrane.

Although extremely thin membranes may be produced in the method of the invention the expanded, stretched membrane should not be so thin that it is highly susceptible to damage when used in an electrolytic cell. In general the expanded, stretched membrane will have a thickness of at least 0.02 mm, preferably at least 0.1 mm.

The elevated temperature at which stretching of the membrane is effected will depend on the nature of the membrane. It will in general, however, be in excess of 40° C., preferably in excess of 55° C. A suitable temperature for use with a particular membrane may be selected by simple experiment. The temperature should not be so high that the organic polymer of the membrane melts or is degraded to a significant extent. In general the elevated temperature at which stretching is effected will not be above 150° C.

Where the expanded, stretched membrane is annealed the annealing temperature may be the same as or similar to the elevated temperature at which the membrane is stretched. The annealing temperature may be higher than the temperature at which stretching is effected. The time for which the expanded, stretched membrane is annealed will determine the extent of the expansion of the membrane which is "locked" into the membrane when the membrane is subsequently cooled to a lower temperature, the longer is this annealing time the less will be the extent of the expansion which remains "locked" into the membrane. In general, the annealing time will be at last 1 minute, but in general it will not be more than 5 hours.

The lower temperature to which the membrane may be cooled will be a temperature at which the membrane does not relax rapidly when the restraining force, if any, is removed from the membrane. It is most convenient to cool the membrane to a temperature which is at or near ambient temperature.

In a further preferred embodiment of the invention, particularly useful where the membrane is to be expanded to a substantial extent by stretching the membrane is stretched at elevated temperature, the membrane is cooled to a lower temperature, e.g. to a temperature at or near ambient, whilst restraining the membrane in the expanded stretched state, and the steps of expansion by stretching at elevated temperature and cooling are repeated at least once each. In this way the desired amount of expansion of the membrane may be effected by stretching in a plurality of stages and there is a decreased possibility of the membrane being damaged, e.g. by tearing, during the stretching.

the ion-exchange membrane is preferably a cation-exchange membrane containing acidic groups or derivatives thereof convertible to acidic groups. In order to provide resistance to the corrosive environment encountered in many electrolytic cells, particularly in chlor-alkali cells, the membrane is preferably a fluoropolymer, and more preferably a perfluoropolymer, containing such acidic groups or derivatives thereof.

Suitable acidic groups include sulphonic acid, carboxylic acid or phosphonic acid. The membrane may contain two or more different acidic groups. Suitable derivatives of the acidic groups include salts of such groups, for example metal salts of such groups, particularly alkali metal salts. Suitable derivatives include in particular derivatives convertible to acidic groups by hydrolysis, for example acid halide groups, e.g.—$SO_2F$ and—COF, nitrile groups —CN, acid amide groups—$CONR_2$, where R is H or alkyl, and acid ester groups, e.g. —COOR, where R is an alkyl group.

Suitable cation-exchange membranes are those described, for example, in the GB Pat. Nos. 1184321, 1402920, 1406673, 1455070, 1497748, 1497749, 1518387 and 1531068.

In the method of the invention it is preferred to use membranes containing derivatives of acidic groups as membranes containing such groups are generally more susceptible to stretching. For example, where the membrane is a fluoropolymer containing carboxylic and groups as ion-exchange groups it is preferred to stretch the membrane in a form in which the carboxylic groups are in the ester form, e.g. in the form of a methyl ester.

Where the membrane contains groups convertible to ion-exchange groups by hydrolysis the hydrolysis may be effected, for example, by contacting the membrane with aqueous alkali metal hydroxide solution, e.g. with aqueous sodium hydroxide solution. As the membrane may tend to swell on hydrolysis it is preferred to effect such hydrolysis after the expanded, stretched membrane has been secured to the electrolytic cell or to a part thereof.

The membrane may be reinforced, for example with a net of a fluoropolymer, although such reinforced membranes are not preferred as difficulty may be experienced in stretching the reinforcing net. The membrane may be in the form of a laminate, or it may be coated with electrode or non-electrode materials.

The expanded stretched membrane may be secured into the electrolytic cell or to a part thereof by any convenient means. For example, the membrane may be securely clamped between a pair of gaskets in the electrolytic cell, or the membrane may be secured to a frame which is subsequently installed in the electrolytic cell, or the membrane may be secured to an electrode.

The method of the present invention is particularly suitable for application to an ion-exchange membrane which is to be installed in an electrolytic cell of the filter press type. Electrolytic cells of the filter press type may comprise a large number of alternating anodes and cathodes with an ion-exchange membrane positioned between each anode and adjacent cathode. Such cells may comprise, for example, fifty anodes alternating with fifty cathodes, although the cell may comprise even more anodes and cathodes, for example up to one hundred and fifty alternating anodes and cathodes.

In the electrolytic cell the electrodes will generally be made of a metal or alloy. The nature of the metal or alloy will depend on whether the electrode is to be used as an anode or cathode and on the nature of the electrolyte which is to be electrolysed in the electrolytic cell.

Where aqueous alkali metal chloride solution is to be electrolysed and the electrode is to be used as an anode the electrode is suitably made of a film-forming metal or an alloy thereof, for example of zirconium, niobium, tungsten or tantalum, but preferably of titanium, and the surface of the anode suitably carries a coating of an electro-conducting electrocatalytically active material. The coating may comprise one or more platinum group metals, that is platinum, rhodium, iridium, ruthenium, osmium or palladium, and/or an oxide of one or more of these metals. The coating of platinum group metal and/or oxide may be present in admixture with one or more non-noble metal oxides, particularly one or more film-forming metal oxides, e.g. titanium dioxide.

Electro-conducting electrocatalytically active materials for use as anode coatings in an electrolytic cell for the electrolysis of aqueous alkali metal chloride solution, and methods of application of such coatings, are well known in the art.

Where aqueous alkali metal chloride solution is to be electrolysed and the electrode is to be used as a cathode the electrode is suitably made of iron or steel, or of other suitable metal, for example nickel. The cathode may be coated with a material designed to reduce the hydrogen overpotential of the electrolysis.

Any suitable construction of electrode may be used in the electrolytic cell. For example the electrode may comprise a plurality of elongated members, e.g. rods or strips, or it may comprise a foraminate surface, e.g. a perforated plate, a mesh, or an expanded metal.

The invention is illustrated by the following examples.

EXAMPLE 1

A rectangular section 35 cm ×30 cm was cut from a 280 micron thick sheet of a cation-exchange membrane of a copolymer of tetrafluoroethylene and a perfluorovinyl ether containing carboxylic acid groups, the ion-exchange capacity of the membrane being 1.3 milli equivalents per gram.

Strips of PVC elastic tape were attached to the sheet at each of the 35 cm long edges of the sheet and strips of aluminum were attached to the sheet at each of the 30 cm long edges of the sheet. The sheet was then mounted in a Bruckner Karo 11 orienter and the temperature of the sheet was raised to 67° C. in an oven associated with the orienter.

The aluminum strips were pulled apart at a rate of 1 meter per minute until the spacing of the aluminum strips attached to the sheet had increased by a factor of 1.5, the PVC elastic strips assisting in the prevention of "waisting" of the sheet. The sheet, whilst mounted on the orienter, was then removed from the oven and cooled to ambient temperature in a stream of air.

The above procedure of stretching the sheet at a temperature of 67° C. and cooling of the sheet to ambient temperature was repeated twice, in the first repeat of the procedure the spacing of the aluminum strips being increased by a factor of 2.5 over the original spacing and in the second repeat of the procedure the spacing of the aluminum strips being increased by a factor of 4.2 over the original spacing.

The resultant cation-exchange membrane film was then removed from the orienter. The film relaxed slightly towards the original dimensions of the sheet. The thickness of the film after this slight relaxation was 80 microns.

The film of cation-exchange membrane produced as described above was securely and tautly clamped between a pair of gaskets of EPDM rubber and mounted in an electrolytic cell equipped with a 7.5 cm diameter nickel mesh cathode and a 7.5 cm diameter titanium mesh anode coated with a coating of a mixture of $RuO_2$ and $TiO_2$ in a proportion of 35 $RuO_2$:65 $TiO_2$ by weight.

310 g/l aqueous NaCl solution at a pH of 8.0 was charged to the anode compartment of the cell and water was charged to the cathode compartment of the cell and the NaCl was electrolysed therein at a temperature of 90° C., the concentration of NaCl in the anode compartment during electrolysis being 200 g/l.

Chlorine and depleted NaCl solution were removed from the anode compartment and hydrogen and aqueous NaOH (35% by weight) were removed from the cathode compartment.

The electrolysis was effected at a current density of 1kA/$m^2$ and the cell voltage was 3.01 volts.

After a total of 20 days electrolysis the cell was opened and the cation-exchange membrane examined. The membrane was found to be taut and not wrinkled.

By way of comparison the above electrolysis procedure was repeated except that a 280 micron thick sheet of cation-exchange membrane was installed in the electrolytic cell, that is a membrane which had not been subjected to the stretching process.

At a current density of 1 kA/$m^2$ the voltage was 3.1 volts and the membrane removed from the cell was found to be wrinkled and no longer taut.

EXAMPLE 2

The electrolysis procedure of Example 1 was repeated at a current density of 2 kA/$m^2$. In this case the voltage was 3.24 volts and, as in the case of Example 1 the membrane, when removed from the cell, was found to be taut and unwrinkled.

By way of comparison the above electrolysis procedure was repeated except that a 280 micron thick sheet of cation-exchange membrane was installed in the electrolytic cell, that is a membrane which had not been subjected to the stretching process.

At a current density of 2 kA/$m^2$ the voltage was 3.4. volts and the membrane removed from the cell was found to be wrinkled and no longer taut.

EXAMPLE 3

The electrolysis procedure of Example 1 was repeated at a current density of 3 kA/$m^2$. In this case the voltage was 3.52 volts and, as in the case of Example 1 the membrane, when removed from the cell, was found to be taut and unwrinkled.

By the way of comparison the above electrolysis procedure was repeated except that a 280 micron thick sheet of cation-exchange membrane was installed in the electrolytic cell, that is a membrane which had not been subjected to the stretching process.

At a current density of 3 kA/$m^2$ the voltage was 3.7 volts and the membrane removed from the cell was found to be wrinkled and no longer taut.

EXAMPLE 4

A sample of a cation-exchange membrane of a copolymer of tetra-fluoroethylene and a perfluorovinyl ether containing sulphonic acid groups in the form of the potassium salt of dimensions 11.5 cm×11.5 cm was taped at its edges with PVC tape and the thus taped membrane was clamped in a stentor frame. The membrane was heated to a temperature of 180° C. and was drawn uniaxially at a draw speed of 0.85m/min until the membrane had been drawn by a factor of 2.0. The membrane was then cooled to ambient temperature and removed from the stentor frame.

The membrane was installed in an electrolytic cell as described in Example 1 and the electrolysis procedure of Example 2 was followed, that is aqueous NaCl solution was electrolysed at a current density of 2kA/$m^2$. NaOH solution at a concentration of 25% by weight was produced at a current efficiency of 50%. The cell voltage was 2.95 volts.

When the electrolytic cell was opened the membrane was found to be taut and unwrinkled.

By way of comparison the electrolysis procedure was repeated except that there was used a membrane as described above which had not been subjected to the *stretching* procedure. The cell operated at a voltage of 3.1 volts and NaOH was produced at a current efficiency of 57%.

When the cell was opened the membrane was found to be wrinkled and no longer taut.

EXAMPLE 5

The stretching procedure of Example 4 was repeated except that the membrane which was used was a copolymer of tetrafluoroethylene and a perfluorovinyl ether containing carboxylic acid methyl ester groups, and the temperature to which the membrane was heated during the stretching was 80° C.

The membrane was installed in an electrolytic cell as described in Example 1, hydrolysed by contact with NaOH solution, and the electrolysis procedure of Example 3 was followed, that is aqueous NaCl solution was electrolysed at a current density of 3kA/m$^2$. NaOH solution at a concentration of 35% by weight was produced at a current efficiency of 94%. The cell voltage was 3.32 volts.

When the electrolytic cell was opened the membrane was found to be taut and unwrinkled.

By way of comparison the electrolysis procedure was repeated except that there was used a membrane as described above which had not been subjected to the stretching procedure. The cell operated at a voltage of 3.4 volts and NaOH was produced at a current efficiency of 94%.

When the cell was opened the membrane was found to be wrinkled and no longer taut.

EXAMPLE 6

A sample of an ion-exchange membrane of a copolymer of tetrafluoroethylene and a perfluorovinyl ether containing carboxylic acid methyl ester groups as used in Example 5 was heated at a temperature of 67° C. and was stretched uniaxially on a stentor frame following the procedure described in Example 4, except that the draw rate was 1 m/min and the membrane was stretched by a factor of 4.3, that is it was stretched to 430% of its original length in the direction of stretch. After completion of the stretching the membrane was cooled rapidly to ambient temperature in a stream of air and removed from the frame.

After standing for 15 minutes the membrane was found to have shrunk by 15% in the direction of stretching, so that in this direction it was 365% of its original length in this direction.

The electrolysis procedure of Example 1 was repeated using the above described membrane. After effecting electrolysis for 20 days the membrane was found to be taut and unwrinkled.

EXAMPLE 7 to 9

The procedure of Example 6 was repeated on three separate samples of membrane except that, prior to cooling and removal from the stentor frame, the samples were annealed after completion of the stretching by heating at 67° C. for respectively 1 minute (Example 7), 2 minutes (Example 8) and 3 minutes (Example 9).

After standing for 15 minutes after removal from the frame the membranes were found to have shrunk, in the direction of stretching, respectively by 11% (Example 7), 10% (Example 8), and 9% (Example 9), that is in this direction the membranes were 383% (Example 7), 387% (Example 8), 391% (Example 9) of their original length.

The electrolysis procedure of Example 1 was repeated using each of the above described membranes. After effecting electrolysis for 20 days each of the membranes was found to be taut and unwrinkled.

We claim:

1. A method of producing an ion-exchange membrane of an organic polymer containing ion-exchange groups or groups convertible to ion-exchange groups in which method the membrane is expanded to increase the surface area per unit weight of the membrane, characterized in that a film of the membrane is heated at an elevated temperature and the membrane is stretched at the elevated temperature in order to effect an increase of at least 100% in the surface area per unit weight of the membrane.

2. A method as claimed in claim 1 characterized in that the membrane is cooled to a lower temperature and at least some of the expansion is retained in the membrane.

3. A method as claimed in claim 1 characterised in that the membrane is cooled to a lower temperature whilst the membrane is restrained in the expanded state.

4. A method as claimed in claim 1 or claim 3 characterised in that the expanded membrane is annealed by heating at an elevated temperature.

5. A method as claimed in claim 1 or claim 3 characterised in that the membrane is stretched by applying a stretching force to opposed edges of the membrane.

6. A method as claimed in claim 1 or claim 3 characterised in that the membrane is stretched uniaxially.

7. A method as claimed in claim 1 or claim 3 characterised in that the membrane is stretched at a temperature of at least 55° C.

8. A method as claimed in claim 4 characterised in that the membrane is annealed by heating at a temperature higher than that at which the membrane is stretched.

9. A method as claimed in claim 2 or claim 3 characterized in that the membrane is stretched by passing the membrane around and between rollers operating at different peripheral speeds.

10. A method as claimed in claim 3 characterized in that the membrane is stretched at elevated temperature and the membrane is cooled to a lower temperature and in that the steps of stretching at elevated temperature and cooling are repeated at least once each.

11. A method as claimed in claim 10 characterised in that the membrane is stretched at elevated temperature and the membrane is cooled to a lower temperature whilst the membrane is restrained in the expanded state, and in that the steps of stretching at elevated temperatures and cooling are repeated at least once each.

12. A method as claimed in claim 1 characterised in that the membrane comprises a fluoropolymer containing ion-exchange groups or groups convertible to ion-exchange groups.

13. A method as claimed in claim 12 characterised in that the ion-exchange groups are sulphonic acid and/or carboxylic acid groups, or groups convertible thereto.

14. A method as claimed in claim 13 characterised in that the ion-exchange groups are carboxylic acid ester groups.

* * * * *